July 17, 1956  LA VERN M. JOHNSON  2,754,955
TIRE HANDLING APPARATUS
Filed Jan. 26, 1955  6 Sheets-Sheet 1
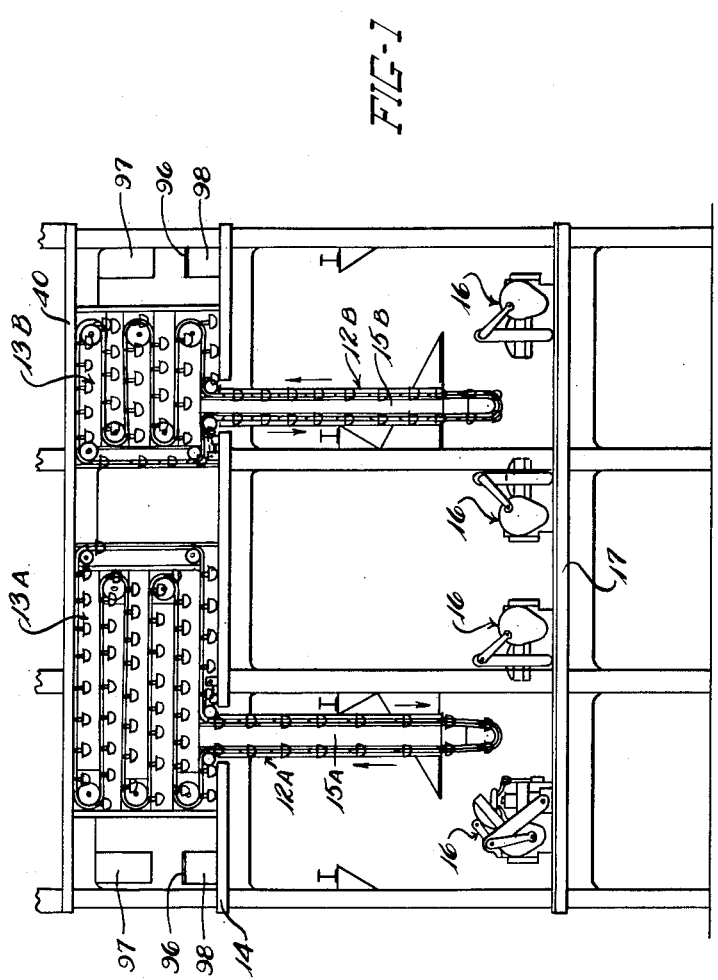
INVENTOR.
LA VERN M. JOHNSON
BY
W. A. Fraser
ATTY.

July 17, 1956 LA VERN M. JOHNSON 2,754,955
TIRE HANDLING APPARATUS
Filed Jan. 26, 1955 6 Sheets-Sheet 2
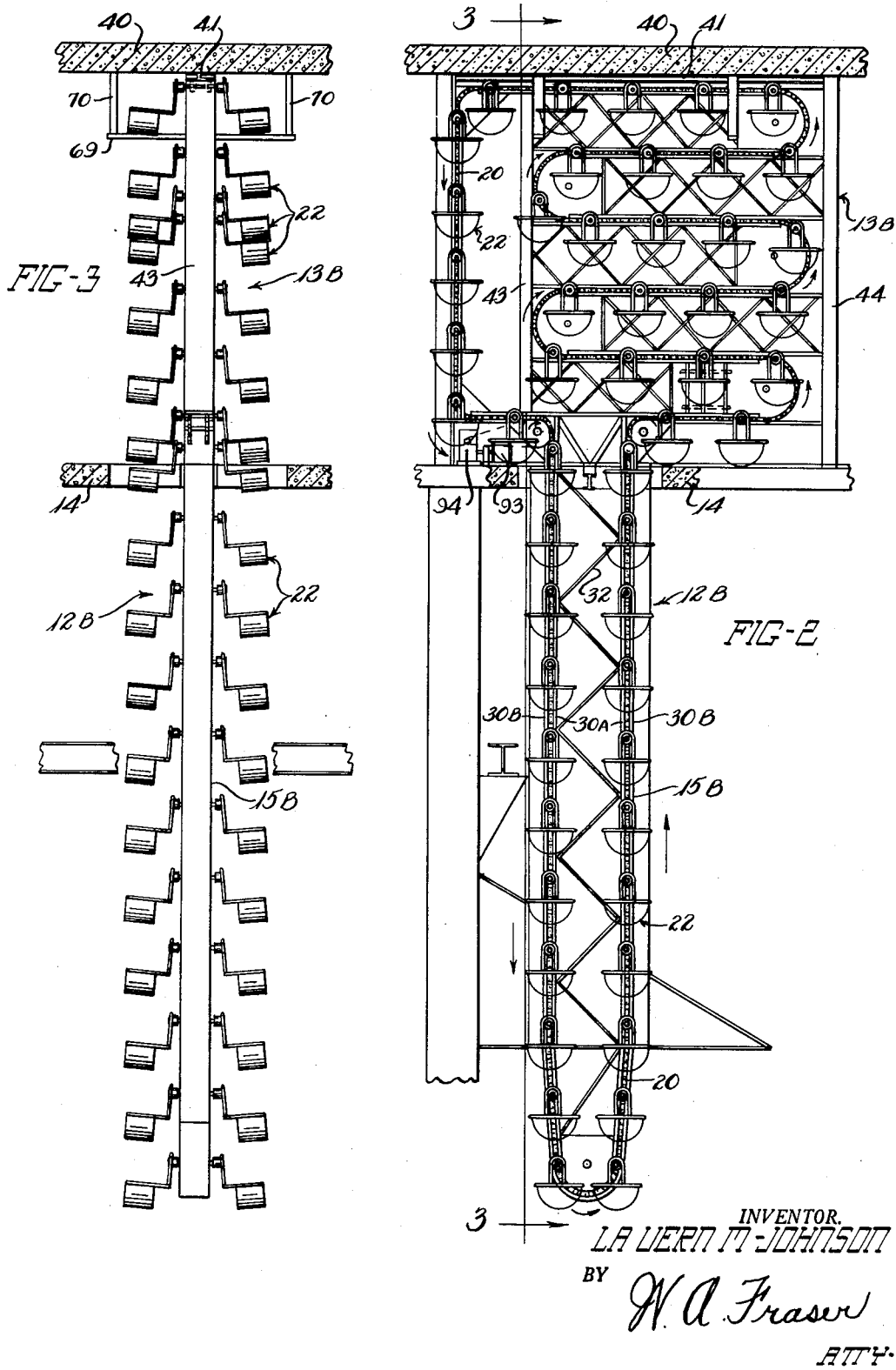
INVENTOR.
LA VERN M. JOHNSON
BY
W. A. Fraser
ATTY.

July 17, 1956   LA VERN M. JOHNSON   2,754,955
TIRE HANDLING APPARATUS
Filed Jan. 26, 1955   6 Sheets-Sheet 3
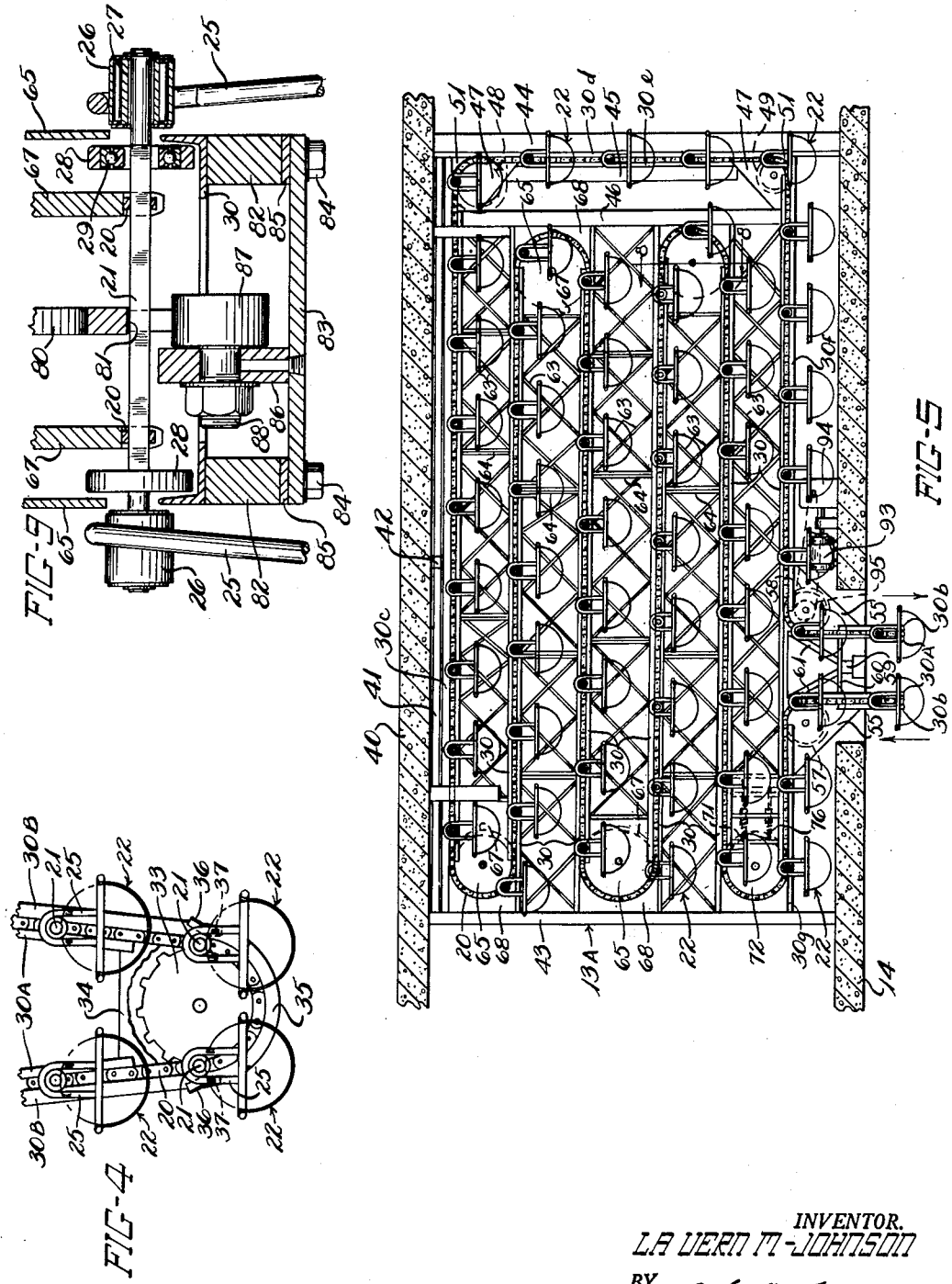
INVENTOR.
LA VERN M. JOHNSON
BY W. A. Fraser
ATTY.

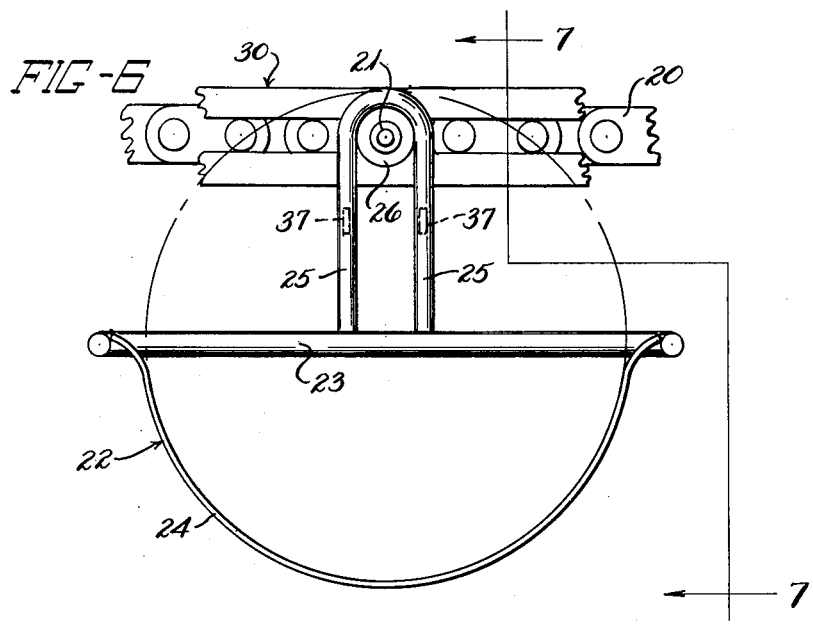
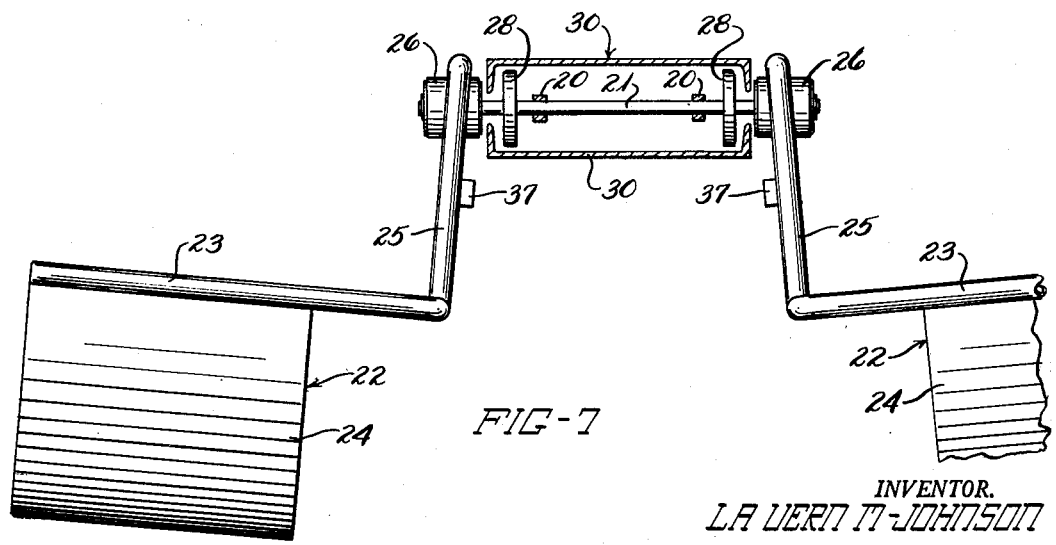

July 17, 1956 LA VERN M. JOHNSON 2,754,955
TIRE HANDLING APPARATUS

Filed Jan. 26, 1955 6 Sheets-Sheet 5

INVENTOR.
LA VERN M. JOHNSON
BY
W. A. Fraser
ATTY.

July 17, 1956 LA VERN M. JOHNSON 2,754,955
TIRE HANDLING APPARATUS
Filed Jan. 26, 1955 6 Sheets-Sheet 6

INVENTOR.
LA VERN M. JOHNSON
BY
W. A. Fraser
ATTY.

United States Patent Office 2,754,955
Patented July 17, 1956

2,754,955

TIRE HANDLING APPARATUS

La Vern M. Johnson, South Gate, Calif., assignor to The Firestone Tire & Rubber Company, Akron, Ohio, a corporation of Ohio Application January 26, 1955, Serial No. 484,120

8 Claims. (Cl. 198—159)

The invention relates generally to conveyors used in industry for facilitating the continuous manufacture of articles in large quantities. More particularly, the invention relates to conveyors used in the mass production of automobile tires and the like.

In the manufacture of automobile tires, uncured tires in the form of substantially cylindrical bands are taken from conventional tire building machines and conveyed, usually by belt conveyors or tram rail chain conveyors of well-known construction, to tire forming and vulcanizing machines which may be on another floor or level in the plant. Because of the difficulties in scheduling the vulcanizing operations to complement the tire building operations, especially in view of inactive time on the presses due to changing molds for making various sizes of tires, it is always necessary to provide a substantial amount of storage space for various sizes of uncured tires.

Tram rail conveyors and belt conveyors provide only a limited amount of storage space for uncured tires, and where belt or tram rail conveyors are used to convey the tires from one level to another along an incline, the spacing of the tires is necessarily increased to prevent interference, thus further reducing the storage capacity of the conveyor. Accordingly, a large number of storage racks for the uncured tires has been required, and these racks not only occupy excessive space, but require excessive time and labor in lifting the tire cylinders from the conveyor and stacking them in the racks, and subsequently transferring them from the racks back to conveyors for transporting them to the forming and vulcanizing machines.

It is an object of the present invention to provide an improved conveyor construction which not only serves to transport the uncured tire cylinders to the forming and vulcanizing presses, but also provides a large amount of tire storage without occupying excessive floor space in the plant.

Another object is to provide an improved storage and supply conveyor having a compact series of connected runs for storage and a forward and return run extending therefrom for supplying uncured tires to one or more vulcanizing presses.

Further objects include the provision of improved means for supporting the several storage runs of the conveyor, and improved tire carriers on the conveyor.

These and related objects are accomplished by the parts, improvements, combinations and arrangements comprising the present invention, preferred embodiments of which are illustrated by way of example in the accompanying drawings and described in detail herein. Various modifications and changes in details of construction may be made within the scope of the invention defined in the appended claims.

The conveyor construction of the invention comprises a preferably double chain conveyor having improved tire carriers mounted at intervals on both sides thereof, tracks for guiding the conveyor chains back and forth in a series or bank of vertically spaced parallel runs providing a storage portion of maximum capacity, and a supply and return run of the conveyor extending vertically from said storage portion into proximity with vulcanizing presses at another level.

Referring to the drawings:

Fig. 1 is a schematic view showing in elevation an arrangement of two conveyor units having different storage capacities for supplying tires to sets of vulcanizing presses on the floor below;

Fig. 2 is an enlarged elevation of the smaller of the two conveyor units;

Fig. 3 is an end elevation thereof, as on line 3—3, Fig. 2;

Fig. 4 is an enlarged fragmentary elevation similar to Fig. 2, showing the lower end of the supply run of the conveyor;

Fig. 5 is an enlarged elevation of the storage portion of the larger of the two conveyor units shown in Fig. 1;

Fig. 6 is a still further enlarged fragmentary elevation, showing one of the improved carriers supported on the conveyor chains;

Fig. 7 is a transverse sectional view, as on line 7—7, Fig. 6, showing two carriers mounted on opposite sides of the conveyor;

Fig. 9 is an enlargement of the lower portion of Fig. 8;

Figure 10:
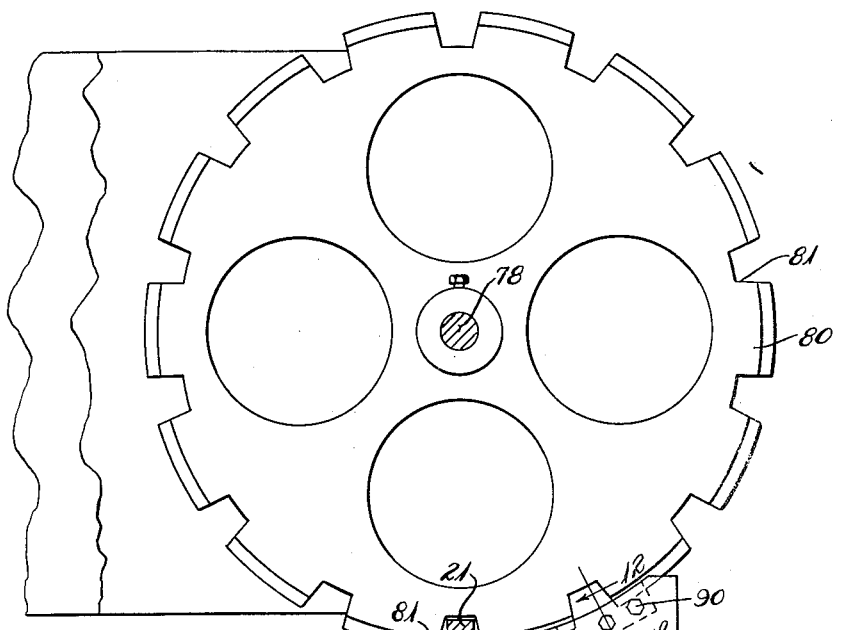
Fig. 10 is a fragmentary sectional view substantially on line 10—10, of Fig. 8.

Referring to Fig. 1, two of the improved conveyor units are shown arranged end-to-end in a factory building in proper spaced relation for supplying uncured tires to sets of forming and vulcanizing presses on the floor below. One of the conveyor units indicated generally at 12A has a relatively large storage portion 13A supported on an upper floor 14, and the other unit indicated generally at 12B has a somewhat smaller storage portion 13B supported on said floor 14. Conveyor 12A may be used for standard size tires which are produced substantially continuously in regularly scheduled production, while conveyor 12B may be used for irregular sizes produced in lesser quantities; hence conveyor 12B requires less storage capacity.

The conveyors 12A and 12B have supply and return runs 15A and 15B extending vertically downward from their storage portions 13A and 13B respectively, and the lower ends of the supply runs are positioned between opposed forming and vulcanizing presses 16 of conventional design, which are supported on a lower floor 17, so that uncured tires can be transferred from the conveyor to each of the presses, as needed. Obviously by utilizing a double chain coveyor with carriers on opposite sides, as shown in Fig. 3, each conveyor can supply uncured tires to two double-cavity presses. As seen in Figs. 2 and 4, the conveyor is preferably stopped when the two lowermost carriers on each side of the conveyor are side-by-side, making four uncured tires easily accessible to be transferred to the four mold cavities of the two adjacent presses 16.

Accordingly, a plurality of laterally spaced conveyors can be located to supply opposed presses arranged in laterally extending rows, each conveyor having a large compact storage portion occupying a minimum of space overhead. Suitable belt conveyors may be provided at the ends of the storage portions for bringing uncured tires from the tire building machines to the conveyors, and two men can easily load the tires from the belt conveyors to the storage portions of a plurality of the improved conveyors. Moreover, while a conveyor unit having a large storage portion is shown combined with a conveyor unit having a smaller storage portion, it will be understood that a combination of two large storage or two small storage units may be used within the scope of the invention.

The two laterally spaced chains 20 comprising a double chain conveyor are conventional roller chains which pass over suitable sprockets at each turn of the conveyor. At intervals along the chains cross shafts 21 extend through opposed links of the chains and are secured thereto, as by welding. As best shown in Figs. 7 and 9, the shafts 21 have mounted on each end a green tire carrier indicated generally at 22. Preferably, each carrier 22 includes a generally U-shaped frame 23 to the legs of which an arcuate bed 24 of sheet aluminum or other suitable material is welded or otherwise secured at its ends (Fig. 6). A hanger loop 25 extends upwardly from the central portion of the frame and the upper end of the loop is supported on and welded to the cylindrical housing of a roller bearing 26, the inner race 27 of which is secured on the end of a shaft 21. (See Fig. 9.)

The shafts 21 each have a pair of guide rollers 28 located between the chains 20 and the bearings 26, each roller being journaled on an anti-friction bearing 29 mounted on the shaft. The guide rollers are enclosed in tracks or guideways formed by opposed channels 30 on the runs between sprockets in the storage portions of the conveyors, as shown in Figs. 6 and 7. The channels in adjacent runs may be braced by suitable interconnecting structural members (not shown). As shown in Figs. 2–5, the cross shafts 21 are carried on the chains 20 at short intervals without causing interference between the carriers at any point along the conveyors, and the conveyor chains are accordingly movably supported in the channel tracks at a plurality of closely spaced points.

Referring to Figs. 2 and 4, the supply and return runs 15A and 15B of the conveyors have inner channels 30A and outer opposed channels 30B forming tracks for the conveyor chains 21, and these channels are hung from the framework of the storage portion of the conveyor in a suitable and well-known manner, the inner channels 30A being preferably interconnected by structural bracing indicated at 32. Referring to Fig. 4, the sprockets 33 at the lower end of the supply and return runs are journaled in plates 34 attached to the inner channels 30A terminating short of the sprockets. The outer channels 30B are connected by a curved channel 35 extending around the sprocket. Flanged guards 36 are secured to the curved channel 35 on opposite sides of the sprocket for cooperating with lugs 37 on the hanger loops 25 of the carriers to prevent outward swinging thereof when two carriers are positioned in unloading position side-by-side at the bottom of the supply and return run of the conveyor, as shown in Fig. 4.

Figure 13:
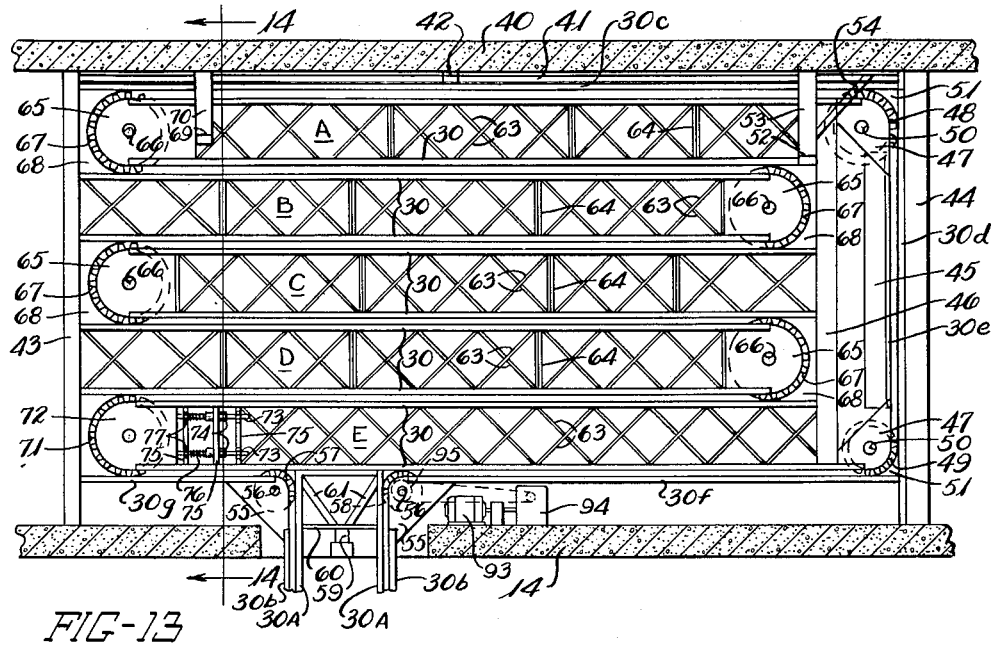
Fig. 13 is a further enlarged elevation similar to Fig. 5, showing the conveyor storage framework with the chains and carriers removed.
Figure 14:
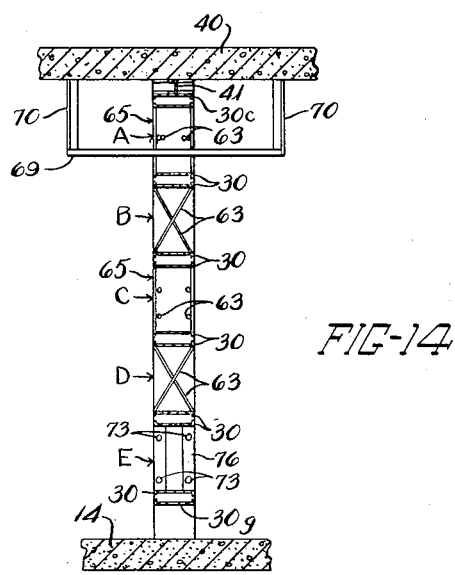
Fig. 14 is a vertical sectional view on line 14—14, Fig. 13.

Referring to Figs. 5 and 2, the storage portions 13A and 13B of the conveyors 12A and 12B, respectively, consist of a series of adjacent parallel runs one above the other in a compact space-saving arrangement. The construction and manner of supporting the conveyor tracks and sprockets in both conveyors is similar, and the framework for storage portion 13A is shown in Figs. 13 and 14.

Storage portion 13A includes six vertically-spaced horizontal runs each having upper and lower channel guides, and a vertical run at one end of the horizontal runs for connecting the top and bottom runs. The guide tracks on the straight portions of all runs are formed by the opposed channels 30. The upper channel 30c for the upper run is hung from the ceiling 40 of the upper floor, preferably by securing it to the lower leg of a longitudinal channel 41 which is attached to the ceiling by brackets 42. At one end of the frame work, the channels 30c and 41 are attached to a heavy steel mast 43 which extends between the ceiling 40 and the floor 14, and at the other end they are attached to the outer vertical channel 30d which forms part of the track for the vertical run. Channel 30d is secured to a structural column 44 supported on the floor 14. An inner vertical channel 30e opposing channel 30d completes the straight portion of the track for the vertical run, and is carried on a structural beam member 45.

The end portions of channel 30e are supported on a vertical mast 46 extending along the ends of the tracks for the horizontal runs by means of side plates 47 connecting the legs of the channel to the mast. These plates 47 form supports for sprockets 48 and 49 connecting the vertical run of the conveyor with the upper and lower runs, respectively, and are provided with bearing apertures 50 for the sprocket shafts. The outer curved edges of the plates 47 cooperate with the inner curved edges of corner plates 51 to form guide slots for the carrier shafts between the vertical run and the upper and lower runs of the conveyor. The mast 46 is supported near its upper end on a transverse beam 52 which is hung at its ends by vertical members 53 depending from the ceiling 40. These members 53 are laterally spaced outwardly of the upper horizontal tracks a sufficient distance to allow the carriers 22 to pass inside of them, and the beam 52 is located so as to allow the carriers on the upper run to pass over it. Inclined brace members 54 also connect the members 53 to the ceiling.

The bottom horizontal track is divided into two sections, one formed by a lower channel 30f extending inwardly from the mast 46 to the opening formed in the floor 14 through which the supply and return run of the conveyor extends, and the other section formed by a lower channel 30g extending from the mast 43 to the other side of the opening. The channels 30f and 30g may be suitably supported on the floor 14, and side plates 55 connect them to the outer channels 30b of the supply and return tracks. The plates 55 have bearing apertures 56 for supporting the sprockets 57 and 58 and have curved guide edges between the channels 30b and 30f and 30g. The inner channels 30A of the supply and return run are supported on a transverse beam 59 extending across the floor opening, by means of angles 60 connecting the channels 30A and 30b and resting on the beam. Diagonal braces 61 may be provided to connect the upper ends of channels 30a to angles 60.

Between the top channel 30c and the bottom channels 30f and 30g, all of the track channels are carried on the upper edges of five cantilever beam structures supported alternately at their ends on the masts 43 and 46 and indicated generally at A, B, C, D and E. Each beam structure comprises upper and lower track channels 30 connected together by criss-cross bracing 63 and vertical struts 64, the beam structures being spaced apart vertically so that the opposed channels of adjacent beams form the tracks for the horizontal runs of the conveyor. The top beam structure A and alternate structures C and E are supported at one end on the mast 46, and the second and fourth structures B and D are supported at one end on the mast 43. The suspended ends of the upper four beam structures are provided with side plates 65 having bearing apertures 66 for supporting chain sprockets 67, and the plates 65 have curved edges cooperating with the curved edges of plates 68 secured to the respective masts, to form guide slots for the carriers between the horizontal runs of the conveyor.

The top beam structure A may be supported near its free end by a rectangular hanger consisting of a transverse channel 69 extending through the beam structure below the path of the carriers on the upper run, and supported at its ends by laterally spaced vertical members 70 attached to the ceiling 40. The bottom beam E structure is supported adjacent its free end by the framework connecting the upper ends of channels 30a and resting on transverse beam 59 across the floor opening. The sprockets 71 at the end of the bottom beam structure are mounted on movable side plates 72 which are yieldably held in position by spring take-up devices including shafts 73 attached at one end to the plates and passing through guide bushings 74 mounted on vertical angles 75 connecting the track channels 30. The compression springs 76 which urge the plates 72 outwardly abut adjusting nuts 77 on the front ends of shafts 73.

Figure 8:
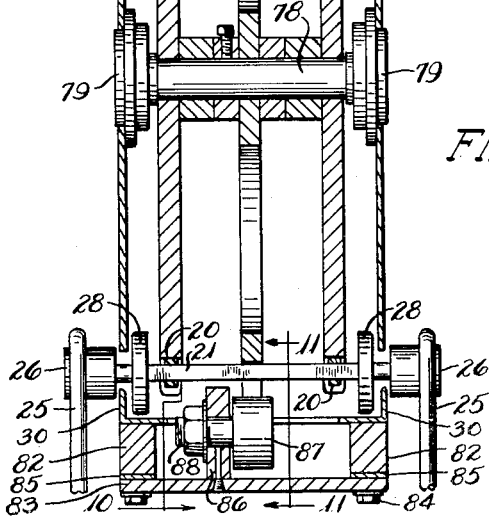
Fig. 8 is an enlarged fragmentary sectional view, as on line 8—8, Fig. 5, showing the manner of supporting the conveyor sprockets on the inner runs in the storage portion.

The three intermediate beam structures B, C and D have improved means supporting the sprockets at their suspended ends, and since the said supporting means are identical, only one of them need be described. Referring to Figs. 8–12 inclusive, Fig. 8 is a cross section showing the manner of supporting the sprockets 67 at the suspended end of beam structure C. The sprockets are carried on a shaft 78 having bearings 79 at its outer end supported in the side plates 65 which extend outwardly from the ends of the channels 30. A circular guide disk 80 is mounted on the shaft 78 between the sprockets 67 to rotate with the sprockets. The periphery of the disk has notches 81 at intervals to accommodate the cross shafts 21 of the carriers as the conveyor chains 20 pass around the sprockets.

As best shown in Fig. 9, the track channel 30 on the upper side of the beam structure D below the guide disk 80 has two spacer bars 82 welded to its undersurface and extending along its edges. A web plate 83 is secured to the bars 82 by bolts 84 and spans the distance between the bars, shim plates 85 being preferably provided between the bars and web plate. Between the bars 82 the channel 30 is slotted and vertical support plate 86 supported on web plate 83 extends upwardly through the slot in slightly offset relation to the guide disk 80. A pair of cam rollers 87 is mounted on studs 88 mounted in support plate 86 and the rollers are arranged side-by-side circumferentially of the disk so as to abut and support its periphery.

Figure 12:
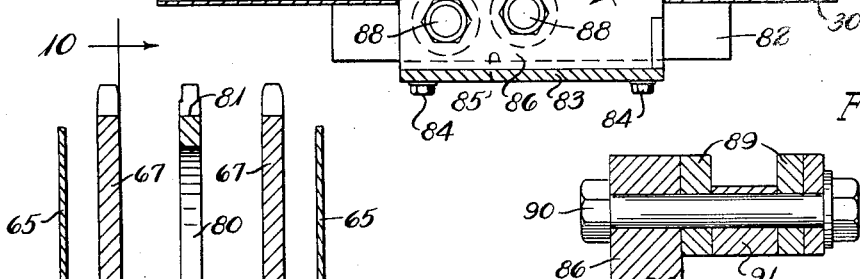
Fig. 12 is a fragmentary sectional view on line 12—12, Fig. 10.
Figure 11:
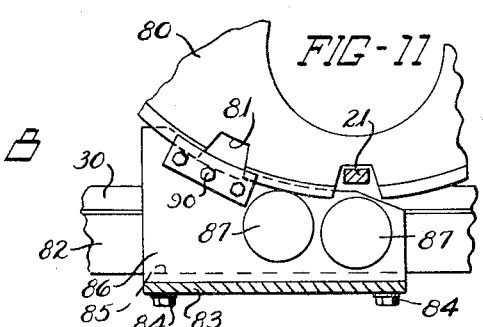
Fig. 11 is a fragmentary view looking in the opposite direction, as on line 11—11, Fig. 8.

The circumferential spacing between the tangent points of the cam rollers 87 is substantially less than the distance between the notches 81 of the disk 80 so that at least one roller always abuts and supports the guide disk regardless of the relative position of the notches 81 as seen in Fig. 11. The support plate 86 preferably has its upper edge curved to follow the periphery of the guide disk 80 and beyond the rollers 87 are side guide plates 89 attached to the plate 80 and straddling the periphery of the disk. These plates 89 are mounted on bolts 90 extending through the plate 86, and are separated by a spacer block 91, as shown in Fig. 12.

Accordingly, through the guide disk 80 and the sprocket shaft on which it is mounted, the suspended end of the beam structure C is supported on the beam structure D adjacent to its connection with the mast 43. Similarly, the suspended ends of beam structures B and D are supported on the respective beam structures immediately below at points adjacent to the masts on which they are carried. If the span from end to end of the intermediate beam structures is relatively short, as in the case of the storage portion 13B of conveyor 12B, it may not be necessary to provide the improved guide disks for supporting the suspended ends of the beams on the beams below.

In the operation of the improved conveyors, the conveyors 12A and 12B are driven preferably in the directions shown by the arrows in Fig. 1 by suitable driving means. As shown in Figs. 2 and 5, such driving means may include a motor 93 and gear reducer 94, operatively connected to a sprocket 95 on the shaft of an adjacent sprocket 58 carrying the conveyor chains. The carriers 22 progress upwardly as they travel back and forth over the successive horizontal runs, and then move downwardly from the top run over the vertical run between sprockets 48 and 49 and along part of the bottom run to the vertical supply runs 15A or 15B. The conveyors are stopped when two carriers are positioned side-by-side at the bottom of each chain of the supply and return runs, and the green tire cylinders are transferred from the carriers to the adjacent vulcanizing presses. Then the conveyors are moved ahead until the next two carriers occupy the bottom side-by-side position, and the conveyors are stopped during the curing cycle of the presses which may be about twenty minutes, at the end of which the cured tires are removed from the presses and replaced with green ones from the bottom of the conveyors.

Concurrently with the vulcanizing operation, green tire cylinders are being conveyed on the upper floor 14 to the ends of the storage portions 13A and 13B, by service belt conveyors such as indicated at 96 in Fig. 1, there preferably being auxiliary storage racks 97 and 98 above and below the conveyors 96. Because of the slow intermittent movement of the conveyors in conformance with the curing cycle, two men, one working along each service belt 96, can load green tire cylinders from the belts to the storage portions of a plurality of conveyors to keep the storage portions of the several conveyors filled.

The closely spaced horizontal runs of the storage portions of the improved conveyors provides a large amount of compact storage space extending vertically above the floor, and occupies space which would otherwise not be used, making the spaces formerly occupied by stationary storage racks available for other purposes. Moreover, the labor in handling green tires is greatly reduced, because a large proportion of the production is transferred directly from the service belts to the storage portions of the conveyors supplying the vulcanizing presses, instead of transferring green tires first to storage racks and subsequently from the storage racks to the supply conveyors, in accordance with conventional practice.

What is claimed is:

1. Conveyor construction for storing green tires in a compact space and supplying them to vulcanizing presses at a lower level, comprising an upper storage portion having vertically spaced horizontal runs of two endless conveyor chains in side-by-side relation, sprockets at alternately opposite ends of said runs for guiding the runs back and forth, supporting masts at each end of said storage portion, cantilever beam structures one for each pair of vertically adjacent runs and supporting the sprockets connecting said runs, alternate beam structures being supported on opposite masts at the ends opposite to the sprockets, a supply and return run of the conveyor extending downwardly from said storage portion, cross shafts connecting said conveyor chains at intervals, and green tire carriers mounted on the ends of said shafts.

2. Conveyor construction for storing green tires in a compact space and supplying them to vulcanizing presses at a lower level, comprising an upper storage portion having at least four vertically spaced horizontal runs of two endless conveyor chains in side-by-side relation, sprockets at alternately opposite ends of said runs for guiding the runs back and forth, supporting masts at each end of said storage portion, cantilever beam structures one for each pair of vertically adjacent runs and supporting the sprockets connecting said runs, alternate beam structures being supported on opposite masts at the ends opposite to the sprockets, means on the sprocket end of each intermediate beam structure and rotatable with the sprockets thereof for supporting said end on the beam structure next below, a supply and return run of the conveyor extending downwardly from said storage portion, cross shafts connecting said conveyor chains at intervals, and green tire carriers mounted on the ends of said shafts.

3. Conveyor construction for storing green tires in a compact space and supplying them to vulcanizing presses at a lower level, comprising an upper storage portion having at least four vertically spaced horizontal runs of two endless conveyor chains in side-by-side relation, sprockets at alternately opposite ends of said runs for guiding the runs back and forth, supporting masts at each end of said storage portion, cantilever beam structures one for each pair of vertically adjacent runs and supporting the sprockets connecting said runs, alternate beam structures being supported on opposite masts at the ends opposite to the sprockets, a supply and return run of the conveyor extending downwardly from said storage portion, cross shafts connecting said conveyor chains at intervals, and green tire carriers mounted on the ends of said shafts, a guide disk mounted between and rotatable with the sprockets of each intermediate beam structure, said guide disk having peripheral notches for receiving said cross shafts, and a roller mounted on the beam structure next below for bearing on the periphery of said disk, to support the disk.

4. Conveyor construction for storing green tires in a compact space and supplying them to vulcanizing presses at a lower level, comprising an upper storage portion having at least four vertically spaced horizontal runs of two endless conveyor chains in side-by-side relation, sprockets at alternately opposite ends of said runs for guiding the runs back and forth, supporting masts at each end of said storage portion, cantilever beam structures one for each pair of vertically adjacent runs and supporting the sprockets connecting said runs, alternate beam structures being supported on opposite masts at the ends opposite to the sprockets, a supply and return run of the conveyor extending downwardly from said storage portion, cross shafts connecting said conveyor chains at intervals, green tire carriers mounted on the ends of said shafts, a guide disk mounted between and rotatable with the sprockets of each intermediate beam structure, said guide disk having peripheral notches for receiving said cross shafts, and a pair of rollers mounted on the beam structure next below for bearing on the periphery of said disk, said rollers being spaced apart circumferentially of the disk so that one roller always abuts the disk between notches.

5. In conveyor construction for storing green tires in a compact space and supplying them to vulcanizing presses at a lower level, an upper storage portion having at least four vertically spaced horizontal runs of two endless conveyor chains in side-by-side relation, sprockets at alternately opposite ends of said runs for guiding the runs back and forth, a cantilever beam structure for each pair of vertically adjacent intermediate runs and supporting the sprockets connecting said runs, means at one end of said conveyor storage portion supporting said beam structure at the end opposite to said sprockets, cross shafts connecting said conveyor chains at intervals, and green tire carriers mounted on the ends of said shafts.

6. In conveyor construction for storing green tires in a compact space and supplying them to vulcanizing presses at a lower level, an upper storage portion having at least four vertically spaced horizontal runs of two endless conveyor chains in side-by-side relation, sprockets at alternately opposite ends of said runs for guiding the runs back and forth, each run having upper and lower guide tracks, a cantilever beam structure embodying the upper track of one intermediate run and the lower track of the intermediate run next below, said structure carrying at its suspended end the sprockets connecting said intermediate runs, means supporting the other end of said beam structure, cross shafts connecting said conveyor chains at intervals, tire carriers on both ends of said shafts, and means on the suspended end of said beam structure between the sprockets thereof and rotatable with said sprockets for supporting said end on the track next below.

7. In conveyor construction for storing green tires in a compact space and supplying them to vulcanizing presses at a lower level, an upper storage portion having at least four vertically spaced horizontal runs of two endless conveyor chains in side-by-side relation, sprockets at alternately opposite ends of said runs for guiding the runs back and forth, each run having upper and lower guide tracks, a cantilever beam structure embodying the upper track of one intermediate run and the lower track of the intermediate run next below, said structure carrying at its suspended end the sprockets connecting said intermediate runs, means supporting the other end of said beam structure, cross shafts connecting said conveyor chains at intervals, tire carriers on both ends of said shafts, a guide disk mounted between and rotatable with the sprockets on the suspended end of said beam structure, said guide disk having peripheral notches for receiving said cross shafts, and means on the track next below said beam structure for bearing on the periphery of said disk to support the same.

8. In conveyor construction for storing green tires in a compact space and supplying them to vulcanizing presses at a lower level, an upper storage portion having at least four vertically spaced horizontal runs of two endless conveyor chains in side-by-side relation, sprockets at alternately opposite ends of said runs for guiding the runs back and forth, each run having upper and lower guide tracks, a cantilever beam structure embodying the upper track of one intermediate run and the lower track of the intermediate run next below, said structure carrying at its suspended end the sprockets connecting said intermediate runs, means supporting the other end of said beam structure, cross shafts connecting said conveyor chains at intervals, tire carriers on both ends of said shafts, a guide disk mounted between and rotatable with the sprockets on the suspended end of said beam structure, said guide disk having peripheral notches for receiving said cross shafts, and a pair of rollers mounted on the track next below for bearing on the periphery of said disk to support the suspended end of said beam structure.

References Cited in the file of this patent
UNITED STATES PATENTS

| | | |
|---|---|---|
| 1,871,372 | James | Aug. 9, 1932 |
| 2,128,057 | Schindler | Aug. 23, 1938 |